(12) United States Patent
Viswanathan

(10) Patent No.: US 11,651,244 B2
(45) Date of Patent: May 16, 2023

(54) METHOD AND APPARATUS FOR PREDICTING SENSOR ERROR

(71) Applicant: HERE GLOBAL B.V., Eindhoven (NL)

(72) Inventor: Anirudh Viswanathan, Berkeley, CA (US)

(73) Assignee: HERE GLOBAL B.V., Eindhoven (NL)

( * ) Notice: Subject to any disclaimer, the term of this patent is extended or adjusted under 35 U.S.C. 154(b) by 1216 days.

(21) Appl. No.: 16/152,092

(22) Filed: Oct. 4, 2018

(65) Prior Publication Data

US 2020/0111011 A1    Apr. 9, 2020

(51) Int. Cl.
| | |
|---|---|
| *G06N 5/04* | (2006.01) |
| *G06T 7/70* | (2017.01) |
| *G05D 1/00* | (2006.01) |
| *G05D 3/00* | (2006.01) |
| *G01C 21/30* | (2006.01) |
| *G01S 7/40* | (2006.01) |
| *H04N 17/00* | (2006.01) |
| *G06N 20/00* | (2019.01) |
| *G01S 7/497* | (2006.01) |
| *G01S 19/39* | (2010.01) |

(52) U.S. Cl.
CPC .............. *G06N 5/04* (2013.01); *G01C 21/30* (2013.01); *G01S 7/40* (2013.01); *G01S 7/497* (2013.01); *G05D 1/0088* (2013.01); *G06N 20/00* (2019.01); *H04N 17/002* (2013.01); *G06T 7/70* (2017.01); *G06T 2207/10028* (2013.01); *G06T 2207/20081* (2013.01); *G06T 2207/30252* (2013.01)

(58) Field of Classification Search
USPC ...................... 348/118, 117, 113; 706/15, 16
See application file for complete search history.

(56) References Cited

U.S. PATENT DOCUMENTS

| | | |
|---|---|---|
| 8,369,577 B2 | 2/2013 | Miyajima |
| 10,060,751 B1* | 8/2018 | Chen ....................... G01C 21/32 |
| 2007/0250263 A1 | 10/2007 | Yamada |
| 2013/0018826 A1 | 1/2013 | Sundararajan et al. |

(Continued)

OTHER PUBLICATIONS

European Office Action for related European Patent Application No. 19201406.6-1001 dated Apr. 6, 2020, 11 pages.

(Continued)

*Primary Examiner* — Daquan Zhao
(74) *Attorney, Agent, or Firm* — Ditthavong, Steiner & Mlotkowski

(57) ABSTRACT

An approach is provided for providing predictive classification of sensor error. The approach involves, for example, receiving sensor data from at least one sensor, the sensor data collected at a geographic location. The approach also involves extracting a set of input features from the sensor data, map data representing the geographic location, or combination thereof. The approach further involves processing the set of input features using a machine learning model to calculate a predicted sensor error of a target sensor operating at the geographic location. The machine learning model, for instance, has been trained on ground truth sensor error data to use the set of input features to calculate the predicted sensor error.

18 Claims, 12 Drawing Sheets

(56) References Cited

U.S. PATENT DOCUMENTS

2017/0177954 A1* 6/2017 Micks .................. G06V 10/147
2018/0156923 A1* 6/2018 Berclaz ................ G01S 19/254

OTHER PUBLICATIONS

Qian et al., "A low-cost GPS/INS integration based on UKF and BP neutral network", published in IEEE, Aug. 18, 2014, 8 pages.
Baek et al., "Accurate Vehicle Position Estimation Using a Kalman Filter and Neural Network-based Approach", Nov. 2017, Published in: 2017 IEEE Symposium Series on Computational Intelligence (SSCI), 8 pages.
Bourdeau et al., "Prediction of GNSS Signal Bias Using a 3D Model in Urban Environments", 2013, 7 pages.
Delmas et al., "GNSS Bias Correction for Localization Systems", Published 2008 in: 2008 11th International Conference on Information Fusion, pp. 138-143.
Lee et al., "GPS/DR Error Estimation for Autonomous Vehicle Localization", article, published Aug. 21, 2015 in Sensors, vol. 15, Issue 8, pp. 20779-20798.
Office Action for related European Patent Application No. 19 201 406.6-1009, dated Aug. 25, 2022, 10 pages.

* cited by examiner

METHOD AND APPARATUS FOR PREDICTING SENSOR ERROR

BACKGROUND

Autonomous driving has quickly become an area of interest for vehicle manufactures and navigation/mapping service providers. One particular area of interest is the development of localization techniques to determine the position and/or direction of the vehicle (e.g., a vehicle pose) at an accuracy sufficient to support autonomous driving. For example, autonomous driving generally requires centimeter-level accuracy or better to ensure safe operation. Traditional localization generally relies on location sensors (e.g., sensors using Global Positioning System (GPS) or equivalent) equipped on the vehicles or associated devices (e.g., portable or embedded navigation devices, smartphones, etc.). However, traditional GPS or similar sensors can be susceptible to errors that have significant impact on localization accuracy. Therefore, service providers and manufacturers face significant technical challenges to characterizing and then accounting for sensor error to improve localization accuracy and/or speed.

SOME EXAMPLE EMBODIMENTS

Therefore, there is a need for an approach for predicting sensor error (e.g., location sensor error).

According to one embodiment, a method for predicting sensor error comprises receiving sensor data from at least one sensor, the sensor data collected at a geographic location. The method also comprises extracting a set of input features from the sensor data, map data representing the geographic location, or combination thereof. The method further comprises processing the set of input features using a machine learning model to calculate a predicted sensor error of a target sensor operating at the geographic location. The machine learning model, for instance, has been trained on ground truth sensor error data to use the set of input features to calculate the predicted sensor error.

According to another embodiment, an apparatus for predicting sensor error, comprises at least one processor, and at least one memory including computer program code for one or more computer programs, the at least one memory and the computer program code configured to, with the at least one processor, cause, at least in part, the apparatus to receive sensor data from at least one sensor, the sensor data collected at a geographic location. The apparatus is also caused to extract a set of input features from the sensor data, map data representing the geographic location, or combination thereof. The apparatus is further caused to process the set of input features using a machine learning model to calculate a predicted sensor error of a target sensor operating at the geographic location. The machine learning model, for instance, has been trained on ground truth sensor error data to use the set of input features to calculate the predicted sensor error.

According to another embodiment, a non-transitory computer-readable storage medium for predicting sensor error carries one or more sequences of one or more instructions which, when executed by one or more processors, cause, at least in part, an apparatus to receive sensor data from at least one sensor, the sensor data collected at a geographic location. The apparatus is also caused to extract a set of input features from the sensor data, map data representing the geographic location, or combination thereof. The apparatus is further caused to process the set of input features using a machine learning model to calculate a predicted sensor error of a target sensor operating at the geographic location. The machine learning model, for instance, has been trained on ground truth sensor error data to use the set of input features to calculate the predicted sensor error.

According to another embodiment, an apparatus for predicting sensor error comprises means for receiving sensor data from at least one sensor, the sensor data collected at a geographic location. The apparatus also comprises means for extracting a set of input features from the sensor data, map data representing the geographic location, or combination thereof. The apparatus further comprises means for processing the set of input features using a machine learning model to calculate a predicted sensor error of a target sensor operating at the geographic location. The machine learning model, for instance, has been trained on ground truth sensor error data to use the set of input features to calculate the predicted sensor error.

According to one embodiment, a method for predicting sensor error comprises collecting ground truth sensor error data for a geographic region. The ground truth sensor data comprises a set of training features extracted from sensor data, map data, or a combination thereof labeled with ground truth sensor error values. The method also comprises training a machine learning model using the ground truth sensor data to calculate a predicted sensor error from a set of input features. The set of input features is extracted from sensor data subsequently collected from a geographic location for which the predicted sensor error for a target sensor is to be calculated.

According to another embodiment, an apparatus for predicting sensor error, comprises at least one processor, and at least one memory including computer program code for one or more computer programs, the at least one memory and the computer program code configured to, with the at least one processor, cause, at least in part, the apparatus to collect ground truth sensor error data for a geographic region. The ground truth sensor data comprises a set of training features extracted from sensor data, map data, or a combination thereof labeled with ground truth sensor error values. The apparatus is also caused to train a machine learning model using the ground truth sensor data to calculate a predicted sensor error from a set of input features. The set of input features is extracted from sensor data subsequently collected from a geographic location for which the predicted sensor error for a target sensor is to be calculated.

According to another embodiment, a non-transitory computer-readable storage medium for predicting sensor error carries one or more sequences of one or more instructions which, when executed by one or more processors, cause, at least in part, an apparatus to collect ground truth sensor error data for a geographic region. The ground truth sensor data comprises a set of training features extracted from sensor data, map data, or a combination thereof labeled with ground truth sensor error values. The apparatus is also caused to train a machine learning model using the ground truth sensor data to calculate a predicted sensor error from a set of input features. The set of input features is extracted from sensor data subsequently collected from a geographic location for which the predicted sensor error for a target sensor is to be calculated.

According to another embodiment, an apparatus for predicting sensor error comprises means for collecting ground truth sensor error data for a geographic region. The ground truth sensor data comprises a set of training features extracted from sensor data, map data, or a combination thereof labeled with ground truth sensor error values. The apparatus also comprises means for training a machine learning model using the ground truth sensor data to calculate a predicted sensor error from a set of input features. The set of input features is extracted from sensor data subsequently collected from a geographic location for which the predicted sensor error for a target sensor is to be calculated.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for predicting sensor error, are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
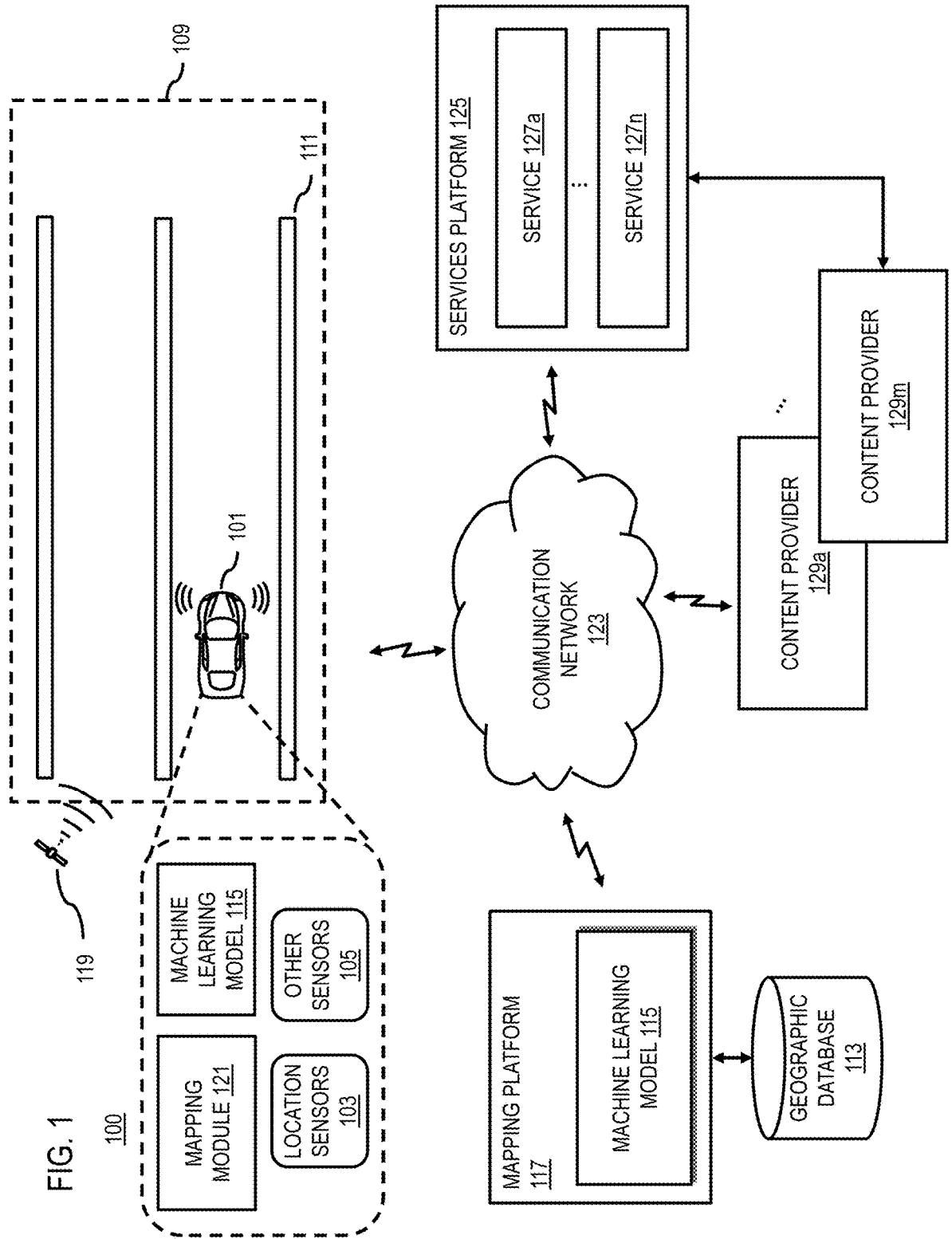
FIG. 1 is a diagram of a system capable of predicting sensor error, according to one embodiment.

FIG. 1 is a diagram of a system capable of predicting sensor error, according to one embodiment. As discussed above, the various embodiments described herein relate broadly to autonomous driving, and specifically to vehicle positioning using sensor data. However, it is contemplated that the embodiments are also applicable to any other type of positioning application (e.g., device positioning), as well as to any other type of sensor data (e.g., collected sensors for detecting any other physical attribute or characteristic) for which error is to be predicted. With respect to vehicle localization, in order to accurately position a vehicle 101, a class of robotics or automated techniques called localizing can be adopted. For example, during localization, the vehicle position and/or heading direction (e.g., a vehicle pose) can be obtained from various sensors of the vehicle 101. As shown in FIG. 1, the vehicle 101 can be equipped with a variety of sensors including but not limited to location sensors 103 (e.g., configured to process signals from positioning satellites 119—e.g., a Global Positioning System (GPS) satellite), and other sensors 105 (e.g., camera sensor, LiDAR sensor, RADAR sensor, etc.) to assist in correctly localizing the vehicle 101 on a map 109.

Accurately determining the vehicle 101's location on the map enables planning of a route, both on fine and coarse scales. On a coarse scale, navigation maps (e.g., a digital map provided from a geographic database 113) allow vehicles 101 to know what roads to use to reach a particular destination. However, on a finer scale, digital maps allow vehicles 101 to know what lanes to be in and when to make lane changes (e.g., lane-level localization). Knowing this information is important for planning an efficient and safe route. This is because, in complicated driving situations, the vehicle 101 may need to execute maneuvers quickly (e.g., lane changes), sometimes before the situations are obvious to the driver or passenger.

With respect to lane localization and also generally with respect to autonomous driving, high accuracy and real-time localization of vehicles 101 is needed. Traditionally, most vehicle navigation systems have accomplished this localization using GPS-based location sensors 103, which generally provide a real-time location with a 95% confidence interval of 7.8 meters. However, in complicated urban environments, reflection of GPS signals can further increase this error, such that one's location may be off by as much as 30 meters. In other words, the challenge with raw-sensor readings such as those from GPS or equivalent is that systematic errors, stemming from multipath reflection in areas such as urban canyons, cause inaccurate readings from the location sensor 103. Given that the width of many lanes is 3-4 meters, this accuracy is not sufficient to properly localize the vehicle 101 (e.g., an autonomous vehicle) so that it can make safe route planning decisions. While sensor fusion using other sensors 105, such as inertial sensors (INS) or inertial measurement units (IMUs) can increase the accuracy of localization by taking into account vehicle movement, the systematic errors in urban canyons or other similar terrain features that result in sensor interference can result in incorrectly positioning the vehicle 101 by as much as several blocks away from its true location.

In general, a localization accuracy of around 10 cm or better is needed for safe driving in many areas (e.g., safe autonomous driving). Traditionally, in order to solve the technical issue of error-prone GPS location data in challenge terrain (e.g., dense urban canyons), two GPS sensors can be used to compute a differential sensor reading that accounts for systematic biases or sensor error. However, maintaining multiple location sensors to support differential sensor readings can increase overhead costs (e.g., in terms of both technical resources and monetary costs).

Figure 2:
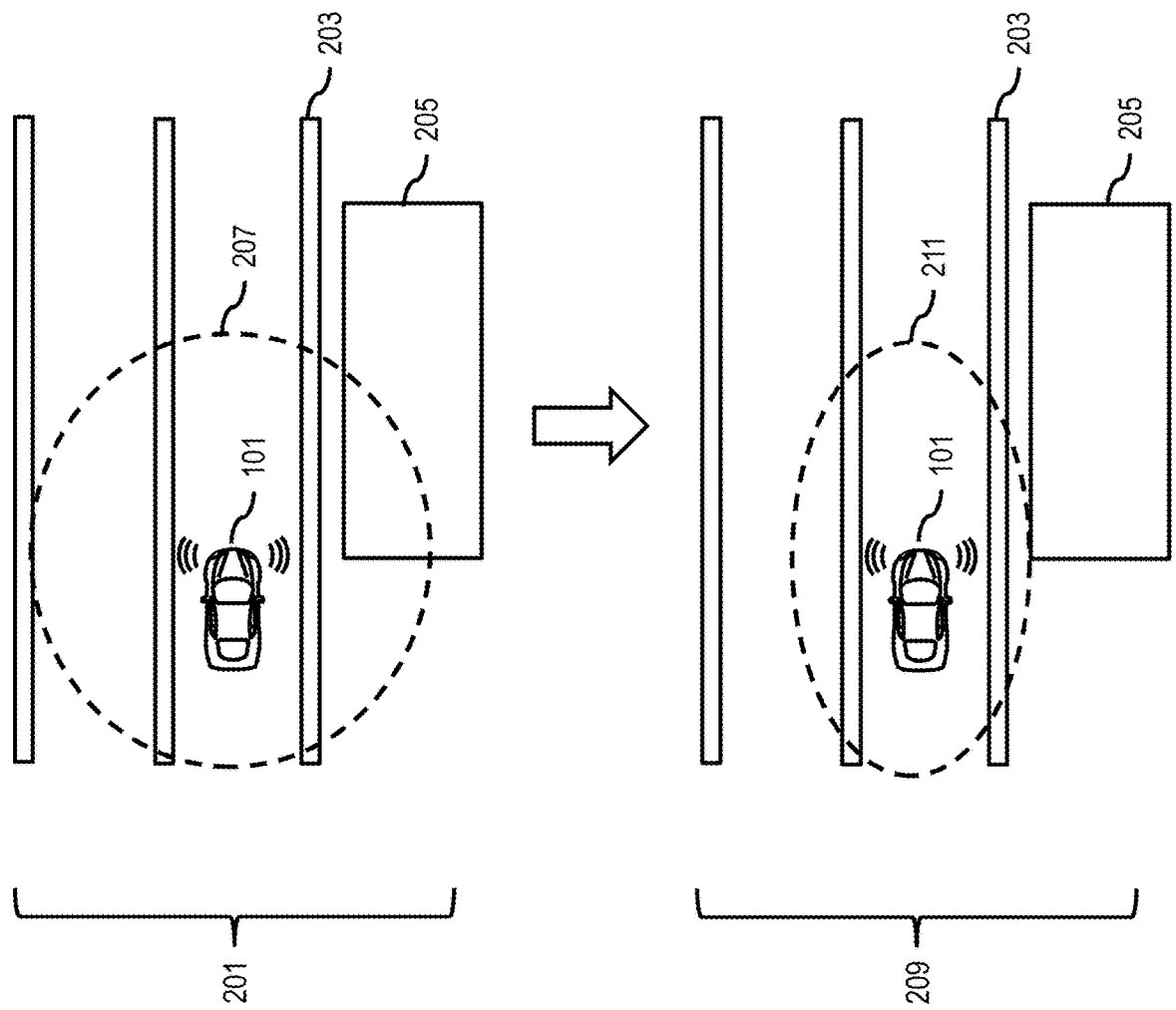
FIG. 2 is a diagram illustrating an example or reducing a localization search space based on predicted sensor error, according to one embodiment.

To address these technical challenges, the system 100 of FIG. 1 introduces a fully automated capability to predict the existence of sensor error at a location being evaluated using a machine learning model 115 (e.g., a trained neural network or equivalent) of a mapping platform 117. In one embodiment, the machine learning model 115 can process sensor readings from other sensors of the vehicle 101 and/or map data representing the location to calculate a predicted sensor error for a location sensor 103 or other target sensor of the vehicle 101. In one embodiment, the predicted sensor error can be used as sensor error priors for localization, for instance, when using sensor fusion. As shown in the example of FIG. 2, the system 100 can leverage the predicted sensor-error priors to ensure faster convergence of the localizer, and consequently quicker vehicle positioning relative to the map. As described above, sensor fusion uses multiple types of sensor data (e.g., LiDAR, camera images, etc.) in addition to GPS sensor data to attempt to localize a vehicle 101. A respective search space (e.g., an area corresponding to a predicted location of the vehicle) for each type of sensor is then calculated. Convergence then refers to identifying a common location among the different search spaces that is the most likely to represent the true location of the vehicle 101.

The example of FIG. 2 illustrates a first scenario 201 in which a vehicle 101 is traveling on a road 203 that is next to a building 205 that can potentially cause multipath issues for the location sensor (e.g., GPS sensor) of the vehicle 101. In this first scenario 201, the system 100 determines a search space 207 for localizing the vehicle 101 without considering any predicted sensor priors. In the contrast, in the second illustrated scenario 209, the system 100 predicts sensor error priors or sensor error according to the various embodiments described herein. In other words, sensor data (e.g., collected from vehicle sensors other than the location sensor, such as not limited to camera, LiDAR, etc.) are input to the trained machined learning model 115 to obtain the GPS-sensor error as output from the model 115. The GPS-sensor error is then subsequently used as map error priors that speed-up convergence of a localizer by reducing the search space 211 (e.g., reduced with respect to the search space 207 of the first scenario 201), enabling faster vehicle positioning. In this case, the search space 211 can be reduced based at least in part on training the machine learning model 115 to take into account environmental structures (e.g., the presence of the building 205) when predicting error sensor priors. For example, the reduction of the search space 211 can be the machine learning model 115 "learning" (e.g., via ground truth training data) that vehicles 101 do not normally occupy the same physical space as buildings or other similar structures.

Figure 3:
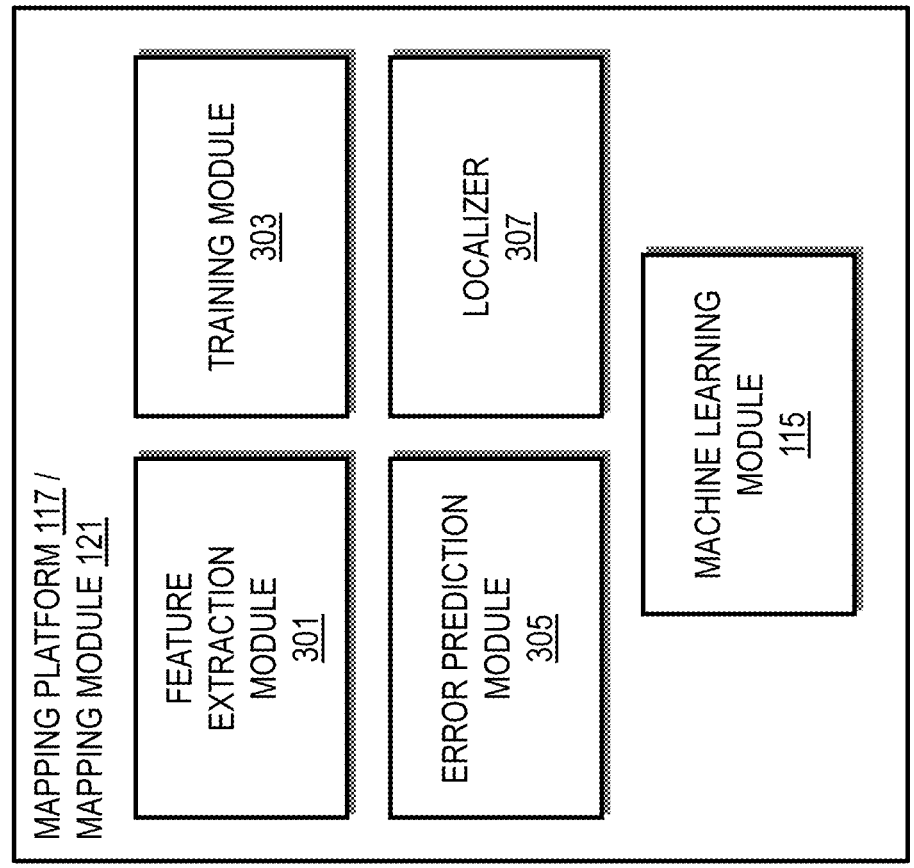
FIG. 3 is a diagram of the components of a mapping platform including a machine learning model for predicting sensor error, according to one embodiment.

In one embodiment, the trained machine learning model 115 can be deployed on the server side in the mapping platform 117 and/or locally at the vehicle 101 in a mapping module 121 over a communication network. Accordingly, within the system 100, the mapping platform 117 and/or the mapping module 121 can perform the functions related to predicting sensor error using machine learning. As shown in FIG. 3, the mapping platform 117 and/or mapping module 121 include one or more components for predicting sensor error according to various embodiments described herein. It is contemplated that the functions of these components may be combined or performed by other components of equivalent functionality. In this embodiment, the mapping platform 117 and/or the mapping module 121 include a feature extraction module 301, a training module 303, an error prediction module 305, a localizer 307, and a machine learning model 115. The above presented modules and components of the mapping platform 117 and/or the mapping module 121 can be implemented in hardware, firmware, software, or a combination thereof. Though depicted as separate entities in FIG. 1, it is contemplated that the mapping platform 117 and/or the mapping module 121 may be implemented as a module of any of the components of the system 100 (e.g., vehicle 101, services platform 125, any of the services 127a-127m of the services platform 125, etc.). In another embodiment, one or more of the modules 301-307 and/or the machine learning model 115 may be implemented as a cloud-based service, local service, native application, or combination thereof. The functions of the mapping platform 117 and/or the mapping module 121 are discussed with respect to FIGS. 4-9 below.

Figure 4:
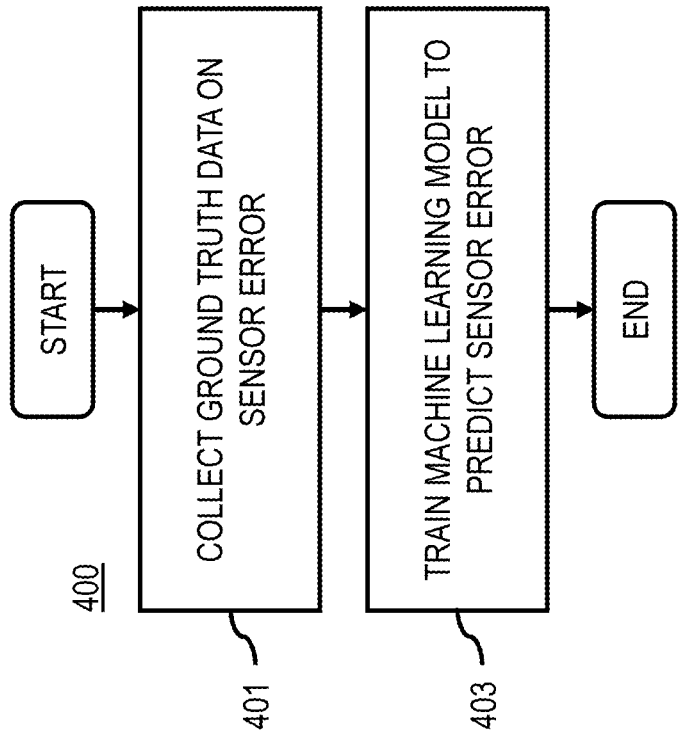
FIG. 4 is a flowchart of a process for training a machine learning model to predict sensor error, according to one embodiment.
Figure 10:
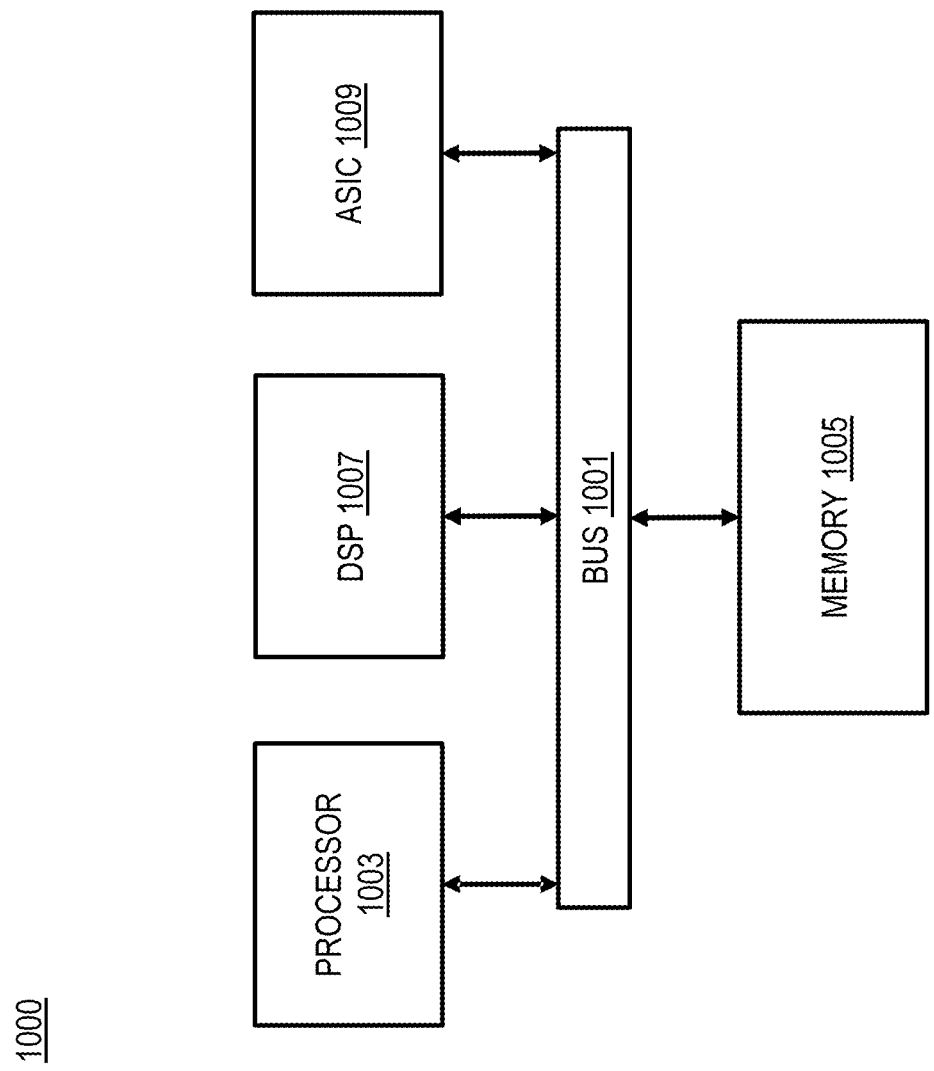
FIG. 10 is a diagram of a chip set that can be used to implement an embodiment of the invention.

FIG. 4 is a flowchart of a process for training the machine learning model 115 to predict sensor error, according to one embodiment. In various embodiments, the mapping platform 117 and/or the mapping module 121 (e.g., alone or in combination) may perform one or more portions of the process 400 and may be implemented in, for instance, a chip set including a processor and a memory as shown in FIG. 10. As such, the mapping platform 117, mapping module 121, and/or any of their component modules can provide means for accomplishing various parts of the process 400, as well as means for accomplishing embodiments of other processes described herein in conjunction with other components of the system 100. In addition, embodiments describing functions/actions related to either of the mapping platform 117 or the mapping module 121 individually is equally applicable to the other. Although the process 400 is illustrated and described as a sequence of steps, its contemplated that various embodiments of the process 400 may be performed in any order or combination and need not include all of the illustrated steps.

In step 401, the feature extraction module 301 collects ground truth sensor error data for a geographic region, wherein the ground truth sensor data comprises a set of training features extracted from sensor data, map data, or a combination thereof labeled with ground truth sensor error values. More specifically, in one embodiment, for collection of training data or ground truth data, the mapping platform 117 leverages resources such as but not limited to previously generated digital map data (e.g., high definition (HD) map data stored in the geographic database 113) as well as probe or trajectory data collected from vehicles 101 that have traversed the geographic areas of interest (e.g., dense urban regions).

Figure 5:
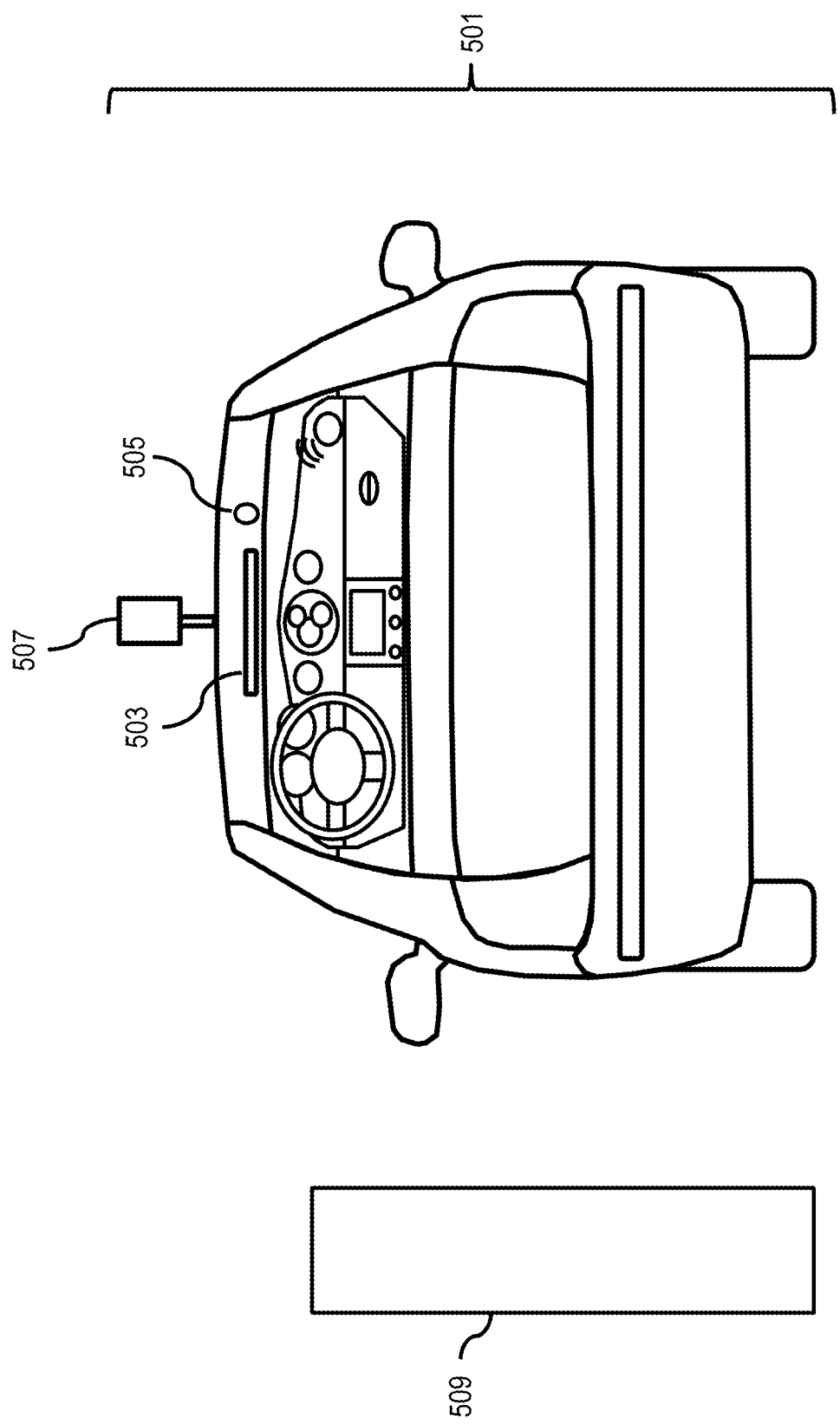
FIG. 5 is a diagram illustrating an example of a vehicle equipped with sensors to support predicting sensor error using machine learning, according to one embodiment.

FIG. 5 is a diagram illustrating an example of a vehicle 501 equipped with sensors to support the collection of training or ground truth data for machine learning of sensor error, according to one embodiment. As shown, the vehicle 501 is equipped with a location sensor 503 (e.g., a GPS receiver) and other sensors such as but not limited to a camera sensor 505 and LiDAR sensor 507. As the vehicle 501 travels in the an area being surveyed, the vehicle 501 can initiate the capture of location data from the location sensor 503, image data from the camera sensor 505, and three-dimensional mesh data from the LiDAR sensor 507. The location data (e.g., vehicle pose data comprising location and/or direction) can be collected with typical consumer-grade location sensors (e.g., a single GPS receiver versus multiple receivers that generate differential GPS readings) that are susceptible potential systematic errors. As discussed above, the systematic errors can be caused by multipath reflections from structures, buildings, terrain, etc. (e.g., structure 509 as shown in FIG. 5) The captured sensor data can then be timestamped with the collection time to generate a data record representing the capture data. For example, the data record (e.g., a probe point) can include but is not limited to the following data fields: <time of collection>, <location/vehicle pose data>, <image data>, <LiDAR mesh data>. As these vehicles drive and collect probe data (e.g., sensor data) in the geographic areas of interest, the probe or sensor data can be collected by the feature extraction module 301 of the mapping platform 117 to use as training data.

To address these limitations, the feature extraction module 301 can automatically generate ground truth sensor error values using more compute-intensive localizers that can more perform more accurate sensor fusion (e.g., fusion of the pose data, image data, mesh data, and/or any other collected sensor data) to localize the corresponding collection vehicle with greater accuracy. Because compute-intensive localizers use sensor fusion algorithms that require significant computational resources and time, these types of localizers are generally executed in a batch or offline mode (e.g., on a cloud-based cluster), as opposed for use in real-time applications. Accordingly, in one embodiment, the raw sensor data is first collected. Then, for each drive in the region or area interest, the feature extraction module 301 can run the compute-intensive localizer in, for instance, a grid-like pattern for each vehicle pose point to identify the corrected vehicle pose. In one embodiment, the computing resources needed by the compute-intensive localizer can vary with the grid-size (e.g., smaller grid sizes with more grid cells require more compute resources). Accordingly, the grid-size can be specified based on the available computing resources. By searching and computing offsets in this pattern, the feature extraction module 301 can identify or select the grid location associated with the highest probability of being the true location of the collection of the vehicle. The pose-offset between the sensed vehicle pose and the corrected vehicle pose can then be used to represent the ground truth sensor error for the corresponding probe or data point.

In one embodiment, feature extraction module 301 can receive the sensor data already labeled or annotated with corresponding ground truth sensor error values for the probe points in the data. For example, if the true locations of each sampling point are known (e.g., location measure using more accurate GPS sensors, manual observations or logging by the drivers, etc.), then the difference or offset between the known locations and the sensed locations at each probe point can be computed to represent the ground truth sensor error value. However, determining ground truth values through manual annotation or through higher accuracy location sensors (e.g., using differential GPS location sensors, etc.) can be cost or resource prohibitive.

In one embodiment where the target sensor being evaluated in is a location sensor, this location data labeled with a ground truth sensor error values represents one sensor stream of the training data set. If other types of sensors are the target sensor being evaluate, the sensor stream with be output of the target sensor labeled with its respective known or true error value. Other sensors than the target sensor (e.g., LiDAR, camera, etc.) would represent other data streams of the training data set.

In one embodiment, the training or ground truth data set can include streams from other data sources such as digital map data (e.g., HD maps of the geographic database 113). For example, with respect to location sensors, the structural features (e.g., buildings, structures, etc.) or terrain can have potential correlation with sensor error (e.g., structures causing multipath interference of GPS sensors and thereby reducing their accuracy). Accordingly, in one embodiment, the feature extraction module 301 can query the geographic database 113 for map data corresponding to the respective location of the probe points in the training data set. The map data then represents yet another data stream. In yet another embodiment, other types of data can also be included the training data set such as but not limited to weather data, sensor type, sensor manufacturer, vehicle characteristics, etc.

After compiling the data streams into the training data set, in one embodiment, the feature extraction module 301 can determine or retrieve relevant features (e.g., characteristics, attributes, properties, etc.) of the compiled training or ground truth data. As used herein, relevant refers to any feature that has an effect or correlation with sensor error with respect to the target sensor. For example, when the target sensor is a location or GPS sensor, features indicating the presence of structures capable of causing multipath interference can potentially be relevant. The feature extraction module 301, for instance, can process image data and/or structure data to determine the presence of buildings, structures, terrain, etc. The characteristics of any detected structures or buildings can be a feature extracted for training the machine learning model 115. Similar data on structures can be extracted from other data streams such as the digital map data by identifying where the map data indicates the presence of any structures, buildings, terrain, etc. within a threshold distance of the probe point location. For example, the digital map data can include three-dimensional (3D) models of nearby structures or buildings, that can be used as input features for training the machine learning model 115. It is noted that the example features discussed above are provided by way of illustration and not as limitations.

In one embodiment, the feature extraction process also comprises converting the feature data into a format suitable for input into the machine learning model 115. For example, the features or data items can be converted into an input vector or matrix for training the by the machine learning model 115. Other examples of feature conversion can include but is not limited to: converting a text label to a Boolean flag; converting text labels to categorical labels; converting dates/times to a standardized format; normalizing or converting the extracted feature data into a common taxonomy or dictionary of terms; etc.

As illustrated above, the training or ground truth data may include any number of features or characteristics the raw sensor data and related information. However, some of the features may not correlate well or at all with sensor error of the target sensor. Including such features in ground truth training data, therefore, would not increase or contribute to the predictive power of the machine learning model 115. Accordingly, in one embodiment, the feature extraction module 301 can further process the ground truth data to extract or select one or more training features. In one embodiment, the feature extraction module 301 can use any statistical method known in the art (e.g., Principal Component Analysis (PCA) and Univariate Selection) to select the best correlated features to predict or classify the sensor error. In other words, the feature extraction module 301 extracts the training features from the ground truth data by first determining a set of candidate features. The mapping platform 117 then selects the training features from among the set of candidate features based on a calculated correlation of the candidate features to predicting sensor error.

In step 403, the mapping platform 117 trains the machine learning model 115 using the ground truth sensor data to calculate a predicted sensor error from a set of input features. For example, the set of input features is extracted from sensor data subsequently collected from a geographic location for which the predicted sensor error for a target sensor is to be calculated (e.g., as described with respect to FIG. 6 below). In one embodiment, the training module 303 can train the machine learning model 115 (e.g., a neural network, support vector machine, or equivalent) by obtaining a feature vector or matrix comprising the selected training features from the feature extraction module 301. During the training process, the training module 303 feeds the feature vectors or matrices of the training data set (e.g., the ground truth data) into the machine learning model 115 to compute a predicted sensor error. The training module 303 then compares the predicted sensor error to the ground truth sensor error values of the ground truth training data set.

Based on this comparison, the training module 303 computes an accuracy of the predictions or classifications for the initial set of model parameters. If the accuracy or level of performance does not meet a threshold or configured level, the training module 303 incrementally adjusts the model parameters until the machine learning model 115 generates predictions at the desired level of accuracy with respect to the predicted sensor error. In other words, the "trained" machine learning model 115 is a model whose parameters are adjusted to make accurate predictions with respect to the ground truth data. The trained machine learning model 115 can then be used as according to the embodiments described below in FIG. 6.

Figure 6:
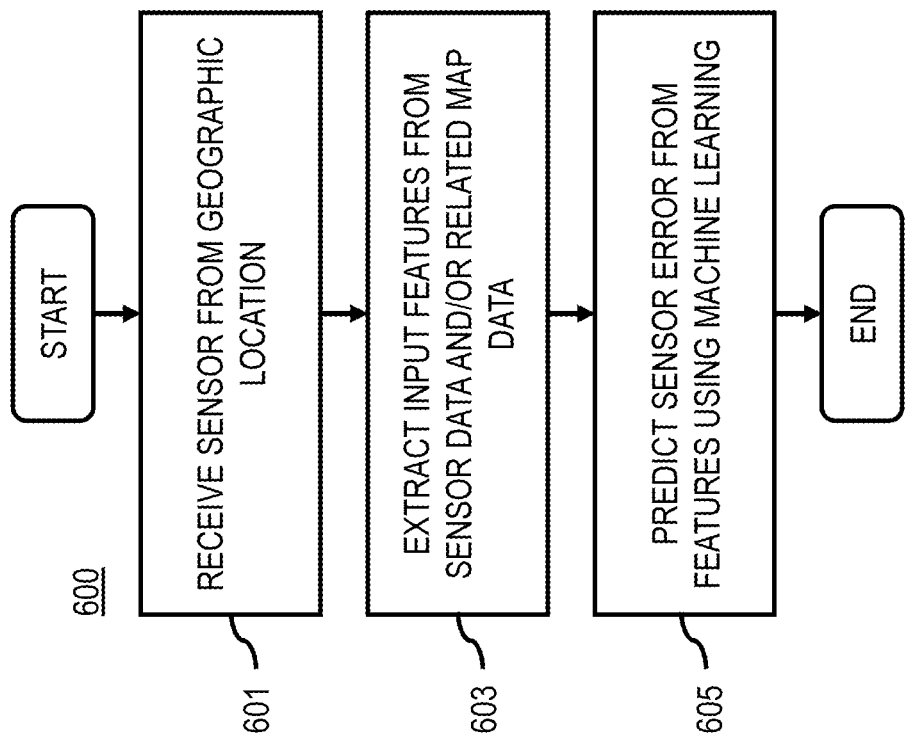
FIG. 6 is a flowchart of a process for using a machine learning model to predict sensor error, according to one embodiment.

FIG. 6 is a flowchart of a process for using the trained machine learning model 115 to predict sensor error, according to one embodiment. In various embodiments, the mapping platform 117 and/or the mapping module 121 (e.g., alone or in combination) may perform one or more portions of the process 600 and may be implemented in, for instance, a chip set including a processor and a memory as shown in FIG. 10. As such, the mapping platform 117, mapping module 121, and/or any of their component modules can provide means for accomplishing various parts of the process 600, as well as means for accomplishing embodiments of other processes described herein in conjunction with other components of the system 100. In addition, embodiments describing functions/actions related to either of the mapping platform 117 or the mapping module 121 individually is equally applicable to the other. Although the process 600 is illustrated and described as a sequence of steps, its contemplated that various embodiments of the process 600 may be performed in any order or combination and need not include all of the illustrated steps.

In one embodiment, the process 600 assumes the availability of a trained machine learning model 115 such as that generated using the process 400 of FIG. 4 or equivalent. For example, the machined learning model 115 can be pretrained model (e.g., neural network, etc.) that regresses sensor errors based on a combination of sensor inputs, map data (e.g., 3D models of the environment), and other relevant features. After training, the machine learning model 115 can be deployed on the server side (e.g., as a cloud-based component) or locally at a client device/entity. For example, when deploying the trained machine learning model 115 to predict sensor error for localization, the machine learning model 115 can be deployed to the mapping module 121 of the vehicle 101 or equivalent component. In one embodiment, deployment comprises instantiating an instance of the trained machine learning model 115 in the mapping module 121, where the trained machine learning model 115 can be used in an online manner. In addition or alternatively, deployment can include using the trained machine learning model 115 to precompute sensor-error priors (e.g., predicted sensor error values) corresponding to specific reference locations. The sensor-error priors can then be provided to the localizer 307 (e.g., in the vehicle 101) to improve localization.

Figure 7A:
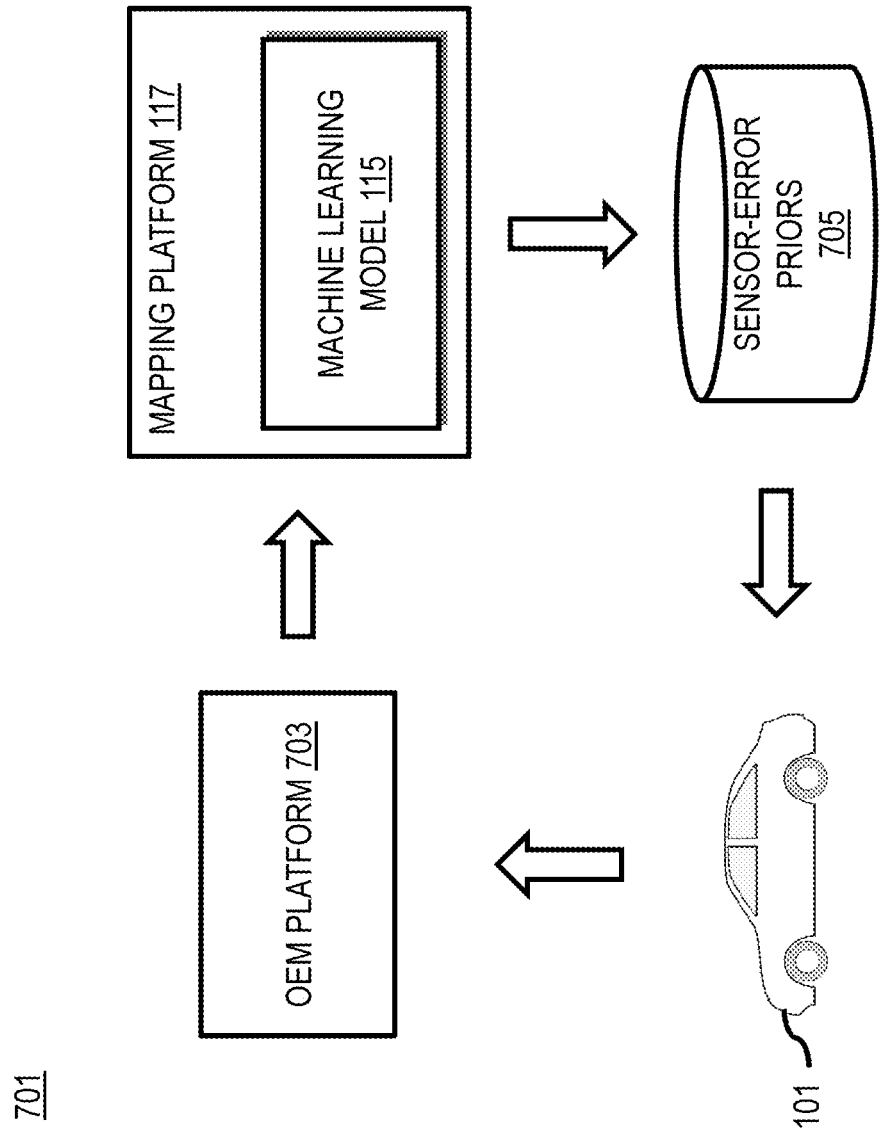
FIGS. 7A and 7B are diagrams illustrating examples of deploying a machine learning model to a vehicle to predict sensor error, according to one embodiment.
Figure 7B:
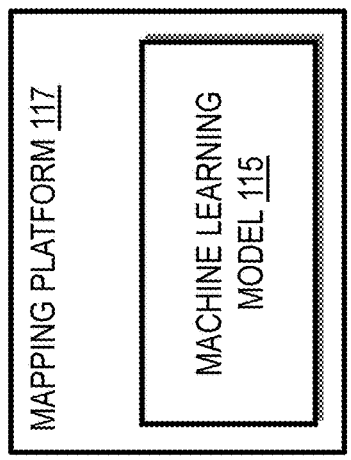
Figure 7B:
Figure 7B:
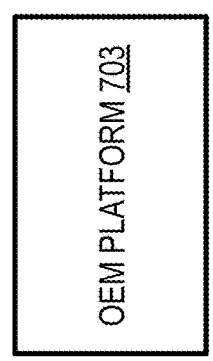
Figure 7B:
Figure 7B:
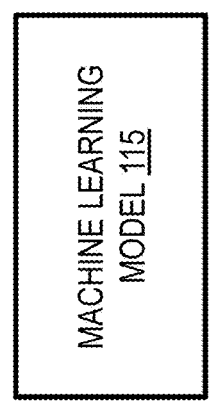
Figure 7B:
Figure 7B:
Figure 7B:
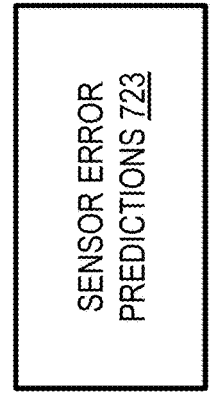

FIGS. 7A and 7B are diagrams illustrating examples of deploying a machine learning model to a vehicle to predict sensor error, according to one embodiment. FIG. 7A illustrates an example architecture 701 in which the machine learning model 115 is instantiated on a network component (e.g., the mapping platform 117). In this way, the processing needed by the machine learning model 115 is provided on the server side, where computing resources (e.g., processing power, memory, storage, etc.) is generally greater than at a local component (e.g., the vehicle 101).

Under the architecture 701, an OEM platform 703 (e.g., operated by automobile manufacturer) collects sensor data observations from vehicles as they travel in a road network. The OEM platform 703 sends the observations to the mapping platform 117 (e.g., typically operated by a map or other service provider) for ingestion and processing. The mapping platform 117 (e.g., where the trained machine learning model 115 is instantiated) then processes the received sensor observations using the machine learning model 115 to predict sensor error according to the embodiments described herein. In one embodiment, the predicted sensor error data can then be fused map attribute information to produce a data layer of sensor-error priors 705 that correlates error priors to locations in the digital map (e.g., HD map of the geographic database 113). The mapping platform 117 can then publish the sensor-error priors 705 for delivery to the vehicle 101 (or localizer 307 of the vehicle 101) either directly or through the OEM platform 703.

FIG. 7B illustrates an alternative architecture 721 in which no sensor error priors are delivered to the vehicle 101 or the localizer 307 of the vehicle 101. Instead, the trained machine learning model 115 is instantiated at a local component or system of a vehicle 101 (e.g., the mapping module 121) traveling on a road network. In this way, the local component uses the machine learning model 115 to provide a local prediction and correction of sensor error (e.g., sensor error predictions 723) based on locally collected sensor and/or map data. In one use case, the local prediction of sensor error is used to localize a vehicle while operating in an autonomous driving mode.

As shown, to enable this architecture 821, the mapping platform 117 trains the machine learning model 115 as previously described in the process 500. The mapping platform 117 can then deliver the trained machine learning model 115 to the vehicle 101 either directly or through the OEM platform 703. A local system or component of the vehicle 101 then executes an instance of the trained machine learning model 115 to make sensor error predictions locally at the vehicle 101. In this way, the vehicle is able detect or map physical dividers on the segments on which it is traveling when a physical divider overlay is not available or when the vehicle does not have communications to network-side components such as the mapping platform 117 as it travels. In one embodiment, as new training data is collected, an updated trained machine learning model 115 can be delivered to the vehicle 101 as needed, periodically, etc.

In one embodiment, when deployed, new sensor readings or data (e.g., camera images or LiDAR data captured in a region of interest) can be input to the trained machine learning model 115 (e.g., a neural network) that is used to predict sensor error (e.g., GPS or location sensor error) for such configuration of the environment as present in the sensor readings (e.g., image, LiDAR data, etc.). For example, in step 601 of the process 600, the error prediction module 305 receives sensor data from at least one sensor, the sensor data collected at a geographic location. For example, the at least one sensor can be target sensor such as a GPS sensor for which error is to be predicted. The sensor data, for instance, includes a stream corresponding to the readings of the GPS data (e.g., data for which error is to be predicted) as well as readings from other sensors of the vehicle 101 (e.g., camera, LiDAR).

In step 603, the error prediction module 305 interacts with the feature extraction module 301 to extract a set of input features from the sensor data (e.g., features related to structures or configuration of the environment at the geographic location where the data was collected), map data representing the geographic location (e.g., 3D models of structures in the area), and/or any other relevant feature as discussed above with respect to training the machine learning model 115. For example, the set of input features includes one or more attributes of the one or more structures, one or more other attributes of the sensor data indicative of the one or more structures, or a combination thereof. Also as described above, feature extraction further comprises converting the features of the sensor data into format suitable for input into the trained machine learning model 115 (e.g., a feature vector/matrix).

In step 605, the error prediction module 305 processes the set of input features using the trained machine learning model 115 to calculate a predicted sensor error of a target sensor operating at the geographic location. In other words, the machine learning model 115 regresses the predicted sensor error using features of the sensor data that were correlated to ground truth sensor error determined during model training. For example, in the use case where the sensor error is GPS-sensor error, the predicted error can be subsequently used as map priors that speed-up convergence of the localizer 307, enabling faster vehicle positioning.

Returning to FIG. 1, in one embodiment, the mapping platform 117 has connectivity over a communication network 123 to the services platform 125 (e.g., an OEM platform) that provides one or more services 127 (e.g., sensor data collection services). By way of example, the services 127 may also be other third-party services and include mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 125 uses the output (e.g. sensor error predictions or sensor-error priors) of the machine learning model 115 to provide services such as navigation, mapping, other location-based services, etc.

In one embodiment, the mapping platform 117 may be a platform with multiple interconnected components and may include multiple servers, intelligent networking devices, computing devices, components and corresponding software for predicting sensor error. In addition, it is noted that the mapping platform 117 may be a separate entity of the system 100, a part of the one or more services 127, a part of the services platform 125, or included within the vehicle 101 (e.g., as a mapping module 121).

In one embodiment, content providers 129a-129m (collectively referred to as content providers 129) may provide content or data (e.g., including geographic data, sensor data, etc.) to the geographic database 113, the mapping platform 117, the services platform 125, the services 127, and the vehicle 101. The content provided may be any type of content, such as map content, textual content, audio content, video content, image content, etc. In one embodiment, the content providers 129 may provide content that may aid in predicting sensor error. In one embodiment, the content providers 129 may also store content associated with the geographic database 113, mapping platform 117, services platform 125, services 127, and/or vehicle 101. In another embodiment, the content providers 129 may manage access to a central repository of data, and offer a consistent, standard interface to data, such as a repository of the geographic database 113.

By way of example, the mapping module 121 can be any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the mapping module 121 can support any type of interface to the user (such as "wearable" circuitry, etc.). In one embodiment, the mapping module 121 may be associated with the vehicle 101 or be a component part of the vehicle 101.

In one embodiment, the vehicle 101 is configured with various sensors for generating or collecting vehicular sensor data, related geographic/map data, etc. In one embodiment, the sensed data represent sensor data associated with a geographic location or coordinates at which the sensor data was collected. In this way, the sensor data can act as observation data that can be aggregated into location-aware training and evaluation data sets. By way of example, the sensors may include a RADAR system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on steering wheels of the vehicles, switch sensors for determining whether one or more vehicle switches are engaged, and the like.

Other examples of sensors of the vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the vehicle 101 may detect the relative distance of the vehicle from a physical divider, a lane or roadway, the presence of other vehicles, pedestrians, traffic lights, potholes and any other objects, or a combination thereof. In one scenario, the sensors may detect weather data, traffic information, or a combination thereof. In one embodiment, the vehicle 101 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 123 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 117, services platform 125, services 127, vehicle 101, and/or content providers 129 communicate with each other and other components of the system 100 using well known, new or still developing protocols. In this context, a protocol includes a set of rules defining how the network nodes within the communication network 123 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
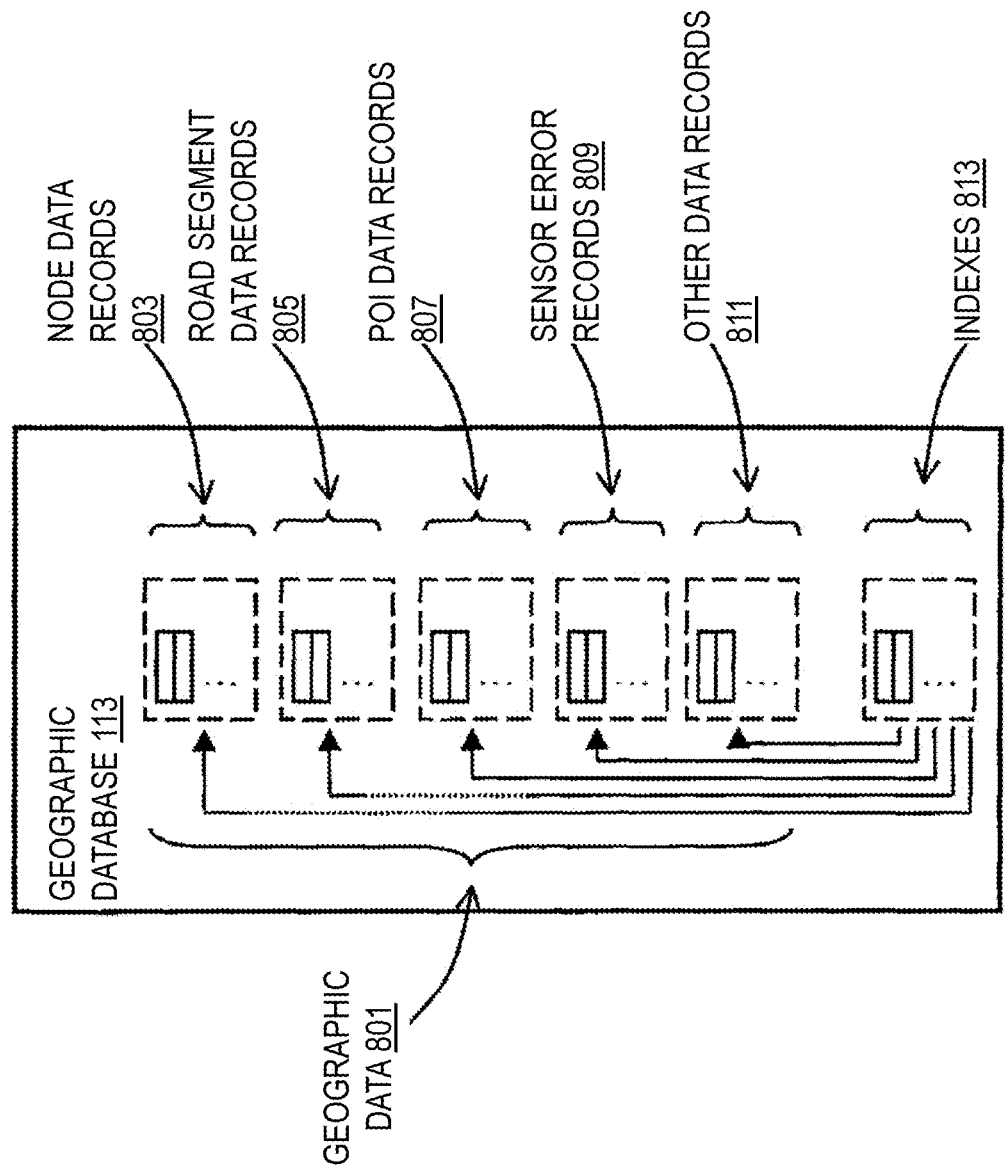
FIG. 8 is a diagram of a geographic database, according to one embodiment.

FIG. 8 is a diagram of a geographic database, according to one embodiment. In one embodiment, the geographic database 113 includes geographic data 801 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature.

In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the geographic database 113 includes high resolution or high definition (HD) mapping data that provide centimeter-level or better accuracy of map features. For example, the geographic database 113 can be based on Light Detection and Ranging (LiDAR) or equivalent technology to collect billions of 3D points and model road surfaces, structures, buildings, terrain, and other map features down to the number lanes and their widths. In one embodiment, the HD mapping data capture and store details such as the slope and curvature of the road, parking spots, lane markings, roadside objects such as sign posts, including what the signage denotes, etc. By way of example, the HD mapping data enable highly automated vehicles to precisely localize themselves on the road, and to determine road attributes (e.g., learned speed limit values) to at high accuracy levels.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably. In one embodiment, the following terminology applies to the representation of geographic features in the geographic database 113.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non-reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 113 follows certain conventions. For example, links do not cross themselves and do not cross each other except at a node. Also, there are no duplicated shape points, nodes, or links. Two links that connect each other have a common node. In the geographic database 113, overlapping geographic features are represented by overlapping polygons. When polygons overlap, the boundary of one polygon crosses the boundary of the other polygon. In the geographic database 113, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 113 includes node data records 803, road segment or link data records 805, POI data records 807, sensor error records 809, other records 811, and indexes 813, for example. More, fewer or different data records can be provided. In one embodiment, additional data records (not shown) can include cartographic ("carto") data records, routing data, and maneuver data. In one embodiment, the indexes 813 may improve the speed of data retrieval operations in the geographic database 113. In one embodiment, the indexes 813 may be used to quickly locate data without having to search every row in the geographic database 113 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points corresponding to the respective links or segments of the road segment data records 805. The road link data records 805 and the node data records 803 represent a road network, such as used by vehicles, cars, and/or other entities. Alternatively, the geographic database 113 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 113 can include data about the POIs and their respective locations in the POI data records 807. The geographic database 113 can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city).

In one embodiment, the geographic database 113 can also include sensor error records 809 for storing predicted sensor error data, sensor error priors, and/or related data. The predicted data, for instance, can be stored as attributes or data records of a sensor error data layer or overlay of the geographic database 113, which fuses with the predicted attributes with map attributes or features. In one embodiment, the sensor error records 809 can be associated with segments of a road link (as opposed to an entire link). It is noted that the segmentation of the road for the purposes of sensor error prediction can be different than the road link structure of the geographic database 113. In other words, the segments can further subdivide the links of the geographic database 113 into smaller segments (e.g., of uniform lengths such as 5-meters). In this way, sensor error can be predicted and represented at a level of granularity that is independent of the granularity or at which the actual road or road network is represented in the geographic database 113. In one embodiment, the sensor error records 809 can be associated with one or more of the node records 803, road segment records 805, and/or POI data records 807; or portions thereof (e.g., smaller or different segments than indicated in the road segment records 805) to provide greater localization accuracy/speed and provide for safer autonomous operation of vehicles. In this way, the predicted sensor error data stored in the sensor error records 809 can also be associated with the characteristics or metadata of the corresponding record 803, 805, and/or 807.

In one embodiment, the geographic database 113 can be maintained by the content provider 129 in association with the services platform 125 (e.g., a map developer). The map developer can collect geographic data to generate and enhance the geographic database 113. There can be different ways used by the map developer to collect data. These ways can include obtaining data from other sources, such as municipalities or respective geographic authorities. In addition, the map developer can employ field personnel to travel by vehicle along roads throughout the geographic region to observe features (e.g., physical dividers, OPPO, VRU, etc.) and/or record information about them, for example. Also, remote sensing, such as aerial or satellite photography, can be used.

The geographic database 113 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for predicting sensor error may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
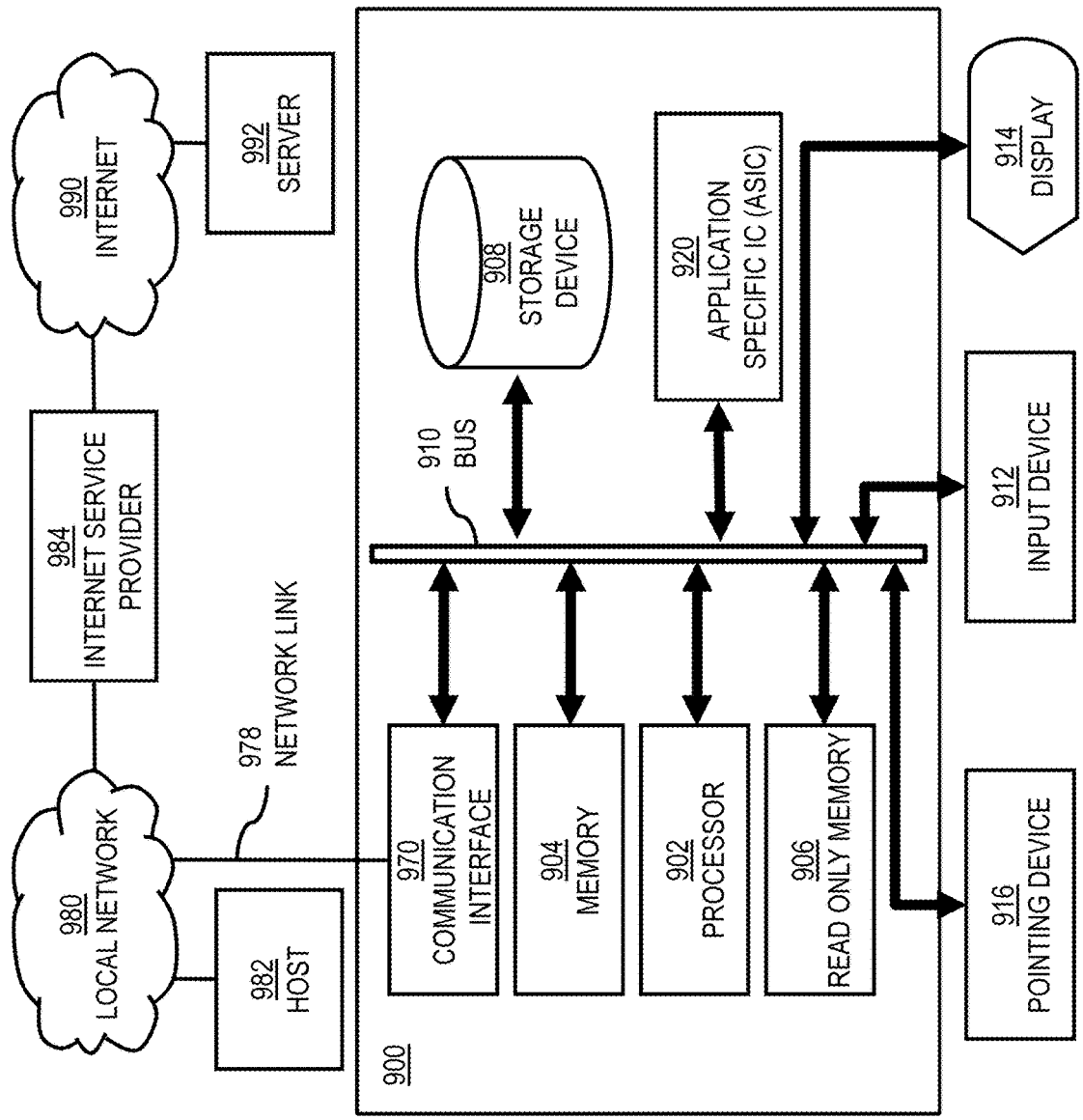
FIG. 9 is a diagram of hardware that can be used to implement an embodiment of the invention.

FIG. 9 illustrates a computer system 900 upon which an embodiment of the invention may be implemented. Computer system 900 is programmed (e.g., via computer program code or instructions) to predict sensor error as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to predicting sensor error. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for predicting sensor error. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for predicting sensor error, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 123 for predicting sensor error.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment of the invention may be implemented. Chip set 1000 is programmed to predict sensor error as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to predict sensor error. The memory 1005 also stores the data associated with or generated by the execution of the inventive steps.

Figure 11:
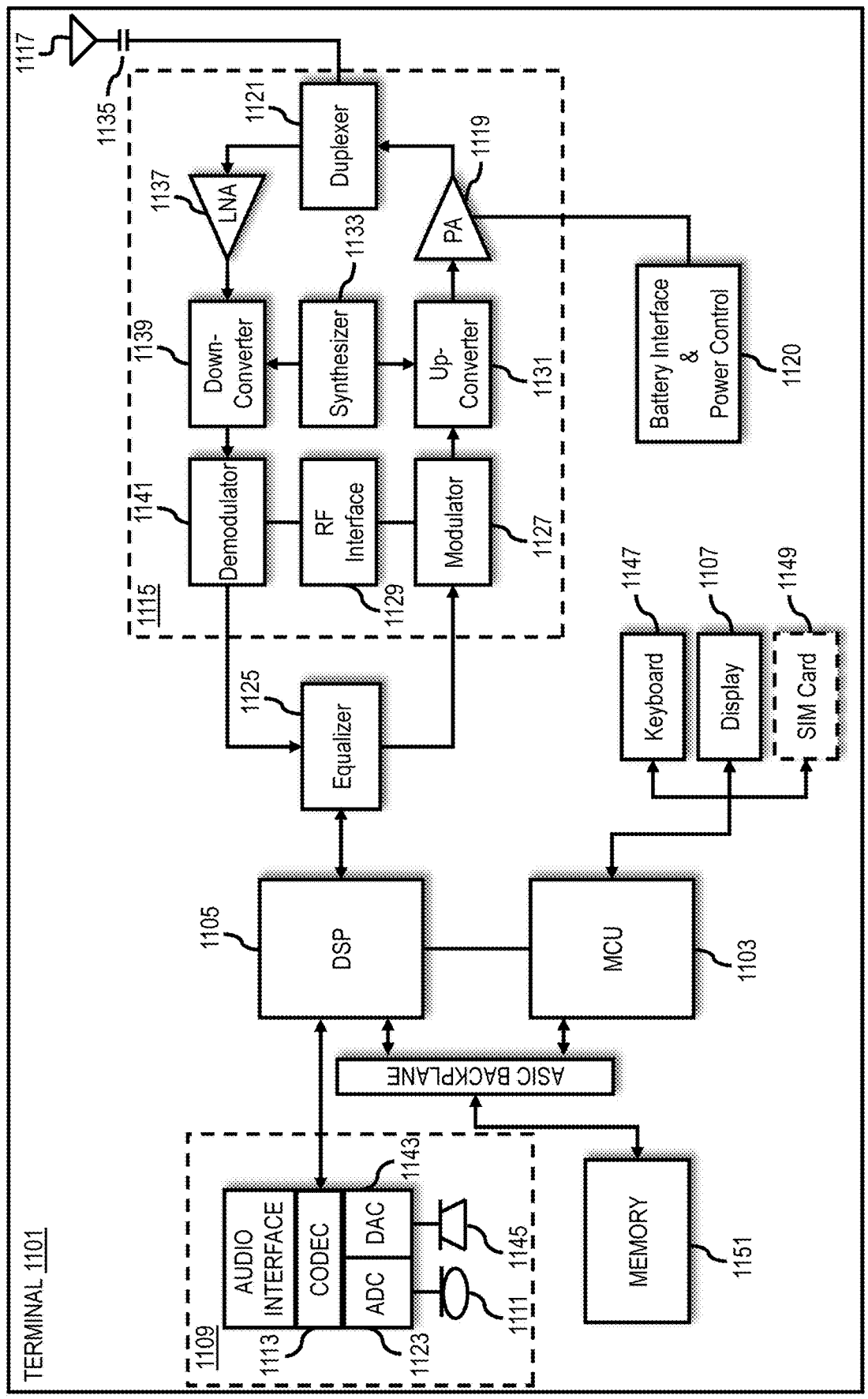
FIG. 11 is a diagram of a terminal that can be used to implement an embodiment of the invention.

FIG. 11 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to predict sensor error. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for predicting sensor error comprising:
   receiving sensor data from at least one sensor, the sensor data collected at a geographic location;
   extracting a set of input features from the sensor data, map data representing the geographic location, or combination thereof; and
   processing the set of input features using a machine learning model to calculate a predicted sensor error of a target sensor operating at the geographic location,
   wherein the machine learning model has been trained on ground truth sensor error data to use the set of input features to calculate the predicted sensor error,
   wherein the ground truth sensor data includes a sensed vehicle pose of a collecting vehicle, the sensed vehicle pose being used to determine a corrected vehicle pose,
   wherein the ground truth sensor error values are based on an offset value between the sensed vehicle pose and the corrected vehicle pose.

2. The method of claim 1, wherein the target sensor is a location sensor, and wherein the predicted sensor error is used as an error prior for localization.

3. The method of claim 2, further comprising:
   reducing a search space for the localization based on the error prior.

4. The method of claim 1, wherein the machine learning model is deployed in a vehicle to provide for localizing the vehicle.

5. The method of claim 1, wherein the at least one sensor is different from the target sensor, and wherein the at least one sensor includes a LiDAR sensor, a camera sensor, or a combination thereof.

6. The method of claim 1, wherein the extracting of the set of input features comprises processing the sensor data to determine one or more structures or a combination thereof at the geographic location.

7. The method of claim 6, wherein the set of input features includes one or more attributes of the one or more structures, one or more other attributes of the sensor data indicative of the one or more structures, or a combination thereof.

8. The method of claim 1, wherein the sensor data is location data collected from a single location sensor of a vehicle.

9. An apparatus for predicting sensor error, comprising:
   at least one processor; and
   at least one memory including computer program code for one or more programs,
   the at least one memory and the computer program code configured to, with the at least one processor, cause the apparatus to perform at least the following,
   collect ground truth sensor error data for a geographic region, wherein the ground truth sensor data comprises a set of training features extracted from sensor data, map data, or combination thereof labeled with ground truth sensor error values; and
   train a machine learning model using the ground truth sensor data to calculate a predicted sensor error from a set of input features,
   wherein the ground truth sensor data includes a sensed vehicle pose of a collecting vehicle,
   wherein the set of input features is extracted from sensor data subsequently collected from a geographic location for which the predicted sensor error for a target sensor is to be calculated;
   run a compute-intensive localizer on the sensed vehicle pose in a grid pattern to identify a corrected vehicle pose,
   wherein the ground truth sensor error values are based on an offset value between the sensed vehicle pose and the corrected vehicle pose.

10. The apparatus of claim 9, wherein the target sensor is a location sensor, and wherein the predicted sensor error is used as an error prior for localization.

11. The apparatus of claim 10, wherein the apparatus is further caused to:
   reduce a search space for the localization based on the error prior.

12. The apparatus of claim 9, wherein the machine learning model is deployed in a vehicle to provide for localizing the vehicle.

13. The apparatus of claim 9, wherein the at least one sensor is different from the target sensor, and wherein the at least one sensor includes a LiDAR sensor, a camera sensor, a RADAR sensor or a combination thereof.

14. A non-transitory computer-readable storage medium for predicting sensor error, carrying one or more sequences of one or more instructions which, when executed by one or more processors, cause an apparatus to at least perform the following steps:
   receiving sensor data from at least one sensor, the sensor data collected at a geographic location;
   extracting a set of input features from the sensor data, map data representing the geographic location, or combination thereof; and
   processing the set of input features using a machine learning model to calculate a predicted sensor error of a target sensor operating at the geographic location,
   wherein the machine learning model has been trained on ground truth sensor error data to use the set of input features to calculate the predicted sensor error,
   wherein the ground truth sensor data includes a sensed vehicle pose of a collecting vehicle, the sensed vehicle pose being used to determine a corrected vehicle pose,
   wherein the ground truth sensor error values are based on an offset value between the sensed vehicle pose and the corrected vehicle pose.

15. The non-transitory computer-readable storage medium of claim 14, wherein the target sensor is a location sensor, and wherein the predicted sensor error is used as an error prior for localization.

16. The non-transitory computer-readable storage medium of claim 14, wherein the extracting of the set of input features comprises processing the sensor data to determine one or more structures or a combination thereof at the geographic location.

17. The non-transitory computer-readable storage medium of claim 16, wherein the set of input features includes one or more attributes of the one or more structures, one or more other attributes of the sensor data indicative of the one or more structures, or a combination thereof.

18. The non-transitory computer-readable storage medium of claim 14, wherein the sensor data is location data collected from a single location sensor of a vehicle.

* * * * *